United States Patent
Aoki et al.

[19]

[11] Patent Number: 5,919,261
[45] Date of Patent: Jul. 6, 1999

[54] METHODS AND APPARATUS FOR CONTROLLING OPERATION OF A LINK LAYER CONTROLLER BASED UPON A STATE OF CONNECTION BETWEEN MULTIPLE ELECTRONIC APPARATUS

[75] Inventors: Yukihiko Aoki; Junji Kato, both of Tokyo, Japan

[73] Assignee: Sony Corporation, Tokyo, Japan

[21] Appl. No.: 08/910,854

[22] Filed: Aug. 13, 1997

[30] Foreign Application Priority Data

Aug. 26, 1996 [JP] Japan ............................ P08-242607

[51] Int. Cl.$^6$ .............................. G06F 13/00; G06F 1/26
[52] U.S. Cl. ........................ 713/300; 710/100; 370/257
[58] Field of Search ..................... 395/750.01, 750.03, 395/280, 200.57; 370/254, 469, 257

[56] References Cited

U.S. PATENT DOCUMENTS

| | | | |
|---|---|---|---|
| 4,652,874 | 3/1987 | Loyer ................................ | 340/825.05 |
| 5,007,051 | 4/1991 | Dolkas et al. ...................... | 370/235 |
| 5,455,569 | 10/1995 | Sherman et al. ................... | 340/825.02 |
| 5,790,876 | 8/1998 | Shima et al. ....................... | 395/750.03 |

FOREIGN PATENT DOCUMENTS

0573204 A2  12/1993  European Pat. Off. ........ H04L 12/40
0727729 A1  8/1996  European Pat. Off. .......... G06F 1/32

OTHER PUBLICATIONS

IEEE Standard for a High Performance Serial Bus, Published Aug. 30, 1996, IEEE Std. 1394–1995, pp. 1–372.

Patent Abstracts of Japan, vol. 95, No. 8, JP 7–134628, Published on May 23, 1995, Hitachi Ltd.

*Primary Examiner*—Gopal C. Ray
*Attorney, Agent, or Firm*—Limbach & Limbach L.L.P.

[57] ABSTRACT

The invention provides an electronic apparatus and an operation mode controlling method for the same by which the power dissipation of a communication interface of a node on an IEEE 1394 serial bus is reduced. The electronic apparatus includes a communication interface which is composed of a physical layer controller, a link layer controller and a CPU. When the electronic apparatus is not connected to any other electronic apparatus via an IEEE 1394 serial bus, the link layer controller does not operate, but after the connection is established, the link layer controller operates.

20 Claims, 4 Drawing Sheets

IEEE 1394 SERIAL BUS

| SET POWER SUPPLY | BUS CONNECTION | 1394 INTERFACE MODE | POWER SUPPLY MODE | | |
|---|---|---|---|---|---|
| | | | CPU | LINK | PHY |
| OFF | NO | OFF | RESET | RESET | RESET |
| | YES | OFF | RESET | RESET | RESET |
| ON | NO | STANDBY | ON | RESET | ON (LPS=0) |
| | YES | ON | ON | ON | ON (LPS=1) |

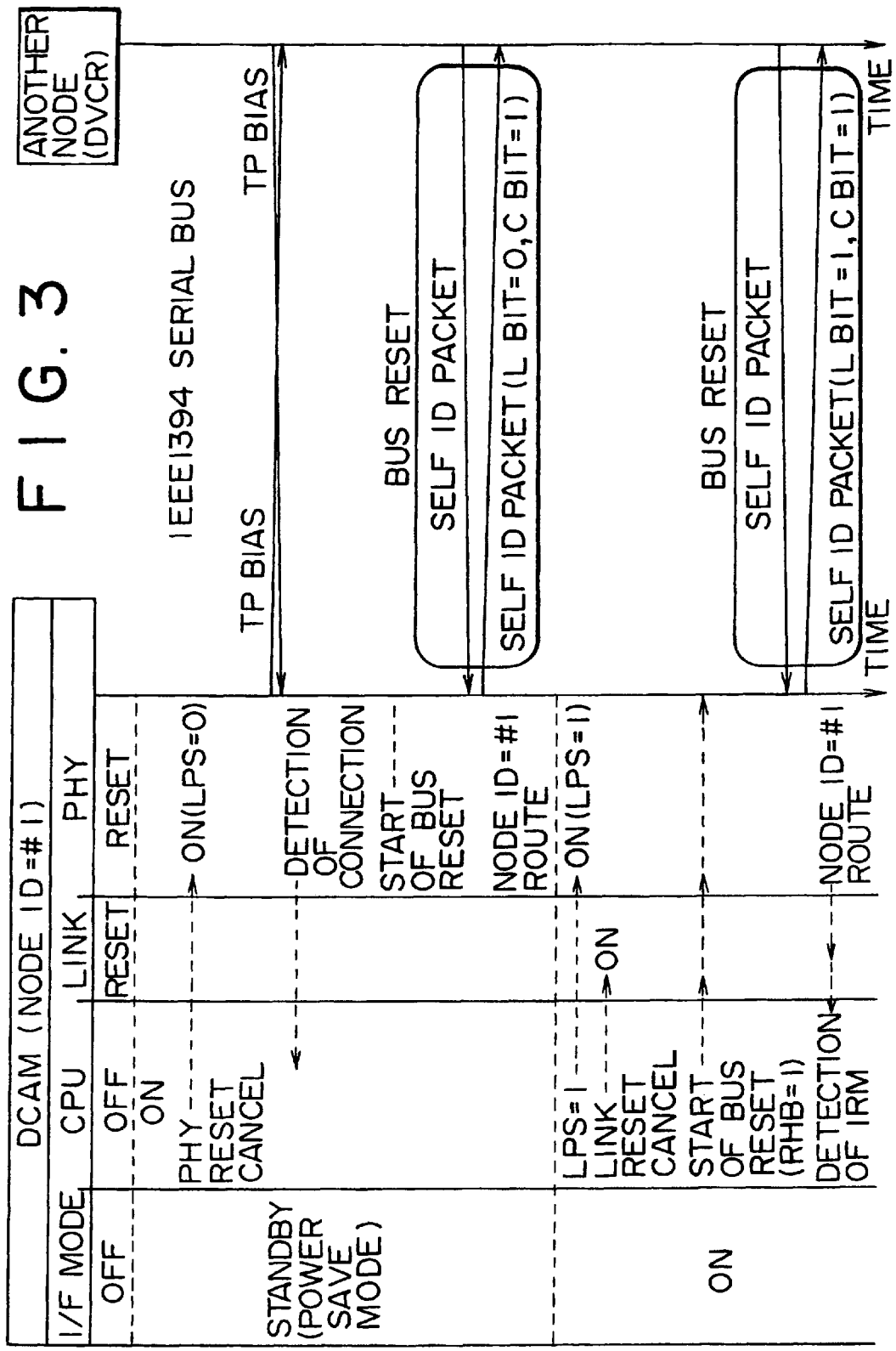

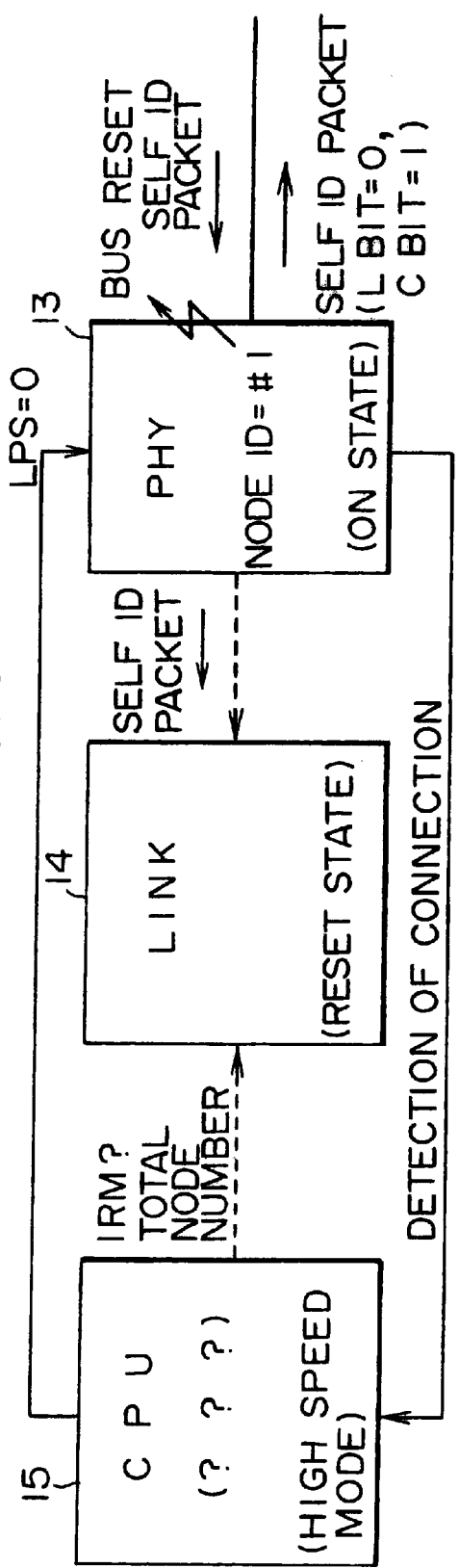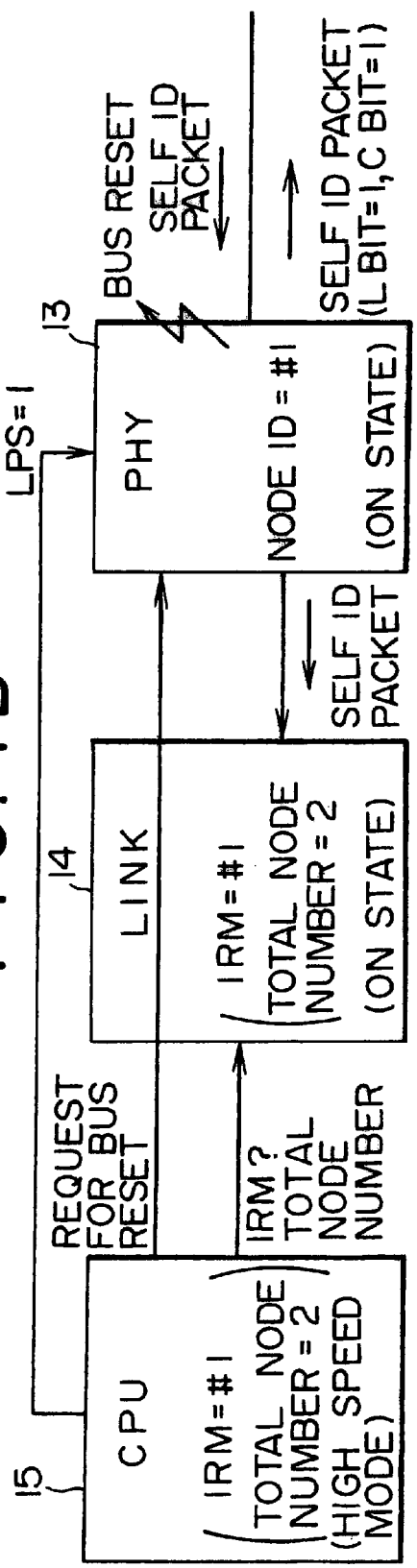

METHODS AND APPARATUS FOR CONTROLLING OPERATION OF A LINK LAYER CONTROLLER BASED UPON A STATE OF CONNECTION BETWEEN MULTIPLE ELECTRONIC APPARATUS

BACKGROUND OF THE INVENTION

This invention relates to an electronic apparatus connected to and used with, for example, serial bus using an IEEE 1394 High performance a serial bus format, and more particularly to an electronic apparatus wherein the power dissipation of a communication interface is reduced.

A system is available wherein electronic apparatus such as a personal computer, a digital video cassette recorder and a digital television receiver are interconnected by an IEEE 1394 serial bus such that packets of a digital video signal, a digital audio signal and a control signal are communicated between the electronic apparatus.

FIG. 5 shows an example of a system of the type just described. Referring to FIG. 5, electronic apparatus A to C may be a personal computer, a digital video cassette recorder and some other electronic apparatus. Ports P of the electronic apparatus A and B and ports P of the electronic apparatus B and C are interconnected by IEEE 1394 serial bus cables 11 and 12, respectively. Such electronic apparatus are hereinafter referred to suitably as nodes.

Though not shown, each of the IEEE 1394 serial cables 11 and 12 has two pairs of twisted pair cables provided in the inside thereof. One pair of the two pairs of twisted pair cables is used for transmission of data, and the other pair is used for transmission of a strobe signal. Each node outputs a bias voltage to one of the two pairs of twisted pair cables and detects a bias voltage on the other pair of twisted pair cables.

As seen in FIG. 5, each node includes, as an interface (which may be hereinafter referred to suitably as 1394 interface) for performing communication via an IEEE 1394 serial bus, a physical layer controller (PHY) 13, a link layer controller (LINK) 14 and a CPU 15. The physical layer controller 13 is formed from an IC and has functions of initialization of a bus, encoding/decoding of transmission/reception data, bus arbitration, outputting/detection of a bias voltage and so forth. Meanwhile, the link layer controller 14 is formed from an IC and has link layer controlling functions such as production/detection of an error correction code, production/detection of a packet and so forth. Further, the CPU 15 is formed from a microcomputer and has a controlling function for an application and so forth.

In the communication system having the construction described above, if power supply to each of the nodes A to C is made available, then a power supply voltage is supplied to all of the physical layer controller 13, link layer controller 14 and CPU 15 of the node. Thereupon, the physical layer controller 13 of the node outputs a bias voltage to one of the two pairs of twisted pair cables of the IEEE 1394 serial bus 11. This bias voltage is detected by the physical layer controller of the other node connected thereto directly by the IEEE 1394 serial bus. As a result, each node detects that another node has been connected to the node itself.

If a bias voltage outputted from the physical layer controller of each node to the bus is detected by the physical layer controller of another node, then bus resetting takes place, and allocation of physical addresses to the individual nodes is automatically completed in a predetermined time. Then, after the allocation of physical addresses to the individual nodes is completed, the nodes A to C start transactions necessary upon bus resetting determined by a protocol.

In each of the nodes described above, when a power supply to the node is made available, a power supply voltage is supplied to all of the physical layer controller, link layer controller and CPU. Accordingly, when the node is not connected to any other node by a bus, wasteful power is dissipated by those blocks. Therefore, where the node is an apparatus which is driven by a battery such as a video cassette recorder integrated with a camera or the like, the continuously usable time of the apparatus is reduced.

SUMMARY OF THE INVENTION

It is an object of the present invention to provide an electronic apparatus and an operation mode controlling method for the electronic apparatus by which reduction of power dissipation of a communication interface such as a 1394 interface is allowed.

In order to attain the object described above, according to an aspect of the present invention, there is provided an electronic apparatus for use with a system wherein the electronic apparatus is connected to a second electronic apparatus by a bus to effect communication with the second electronic apparatus, comprising a communication interface for performing communication via the bus, the communication interface including a physical layer controller, a link layer controller, and a CPU, the link layer controller being constructed so as not to operate when the electronic apparatus is not connected to the second electronic apparatus via the bus but so as to operate after the connection to the second electronic apparatus is established.

According to another aspect of the present invention, there is provided an electronic apparatus for use with a system wherein the electronic apparatus is connected to a second electronic apparatus by a bus to effect communication with the second electronic apparatus, comprising a communication interface for performing communication via the bus, the communication interface including a physical layer controller, a link layer controller, and a controller for an application layer and so forth, the link layer controller having a power supply mode which is kept, even if the electronic apparatus is in a power-on state, in a reset state until after the connection of the electronic apparatus to the second electronic apparatus via the bus is confirmed, the reset state of the power supply mode of the link layer controller being cancelled after the connection is confirmed.

According to a further aspect of the present invention, there is provided an operation mode controlling method for an electronic apparatus, comprising the step of controlling a link layer controller in the electronic apparatus so that, when the electronic apparatus tries to communicate with a second electronic apparatus connected thereto by a bus, the link layer controller does not operate while the electronic apparatus is not connected to the second electronic apparatus, but after the connection is established, the link layer controller is rendered operative.

According to a still further aspect of the present invention, there is provided an operation mode controlling method for an electronic apparatus, comprising the step of controlling a link layer controller in the electronic apparatus so that, when the electronic apparatus tries to communicate with a second electronic apparatus connected thereto by a bus, even if the electronic apparatus is in a power-on state, a power supply mode of the link layer controller is kept in a reset state until after the connection of the electronic apparatus to the second electronic apparatus via the bus is confirmed, and after the connection is confirmed, the reset state of the power supply mode of the link layer controller is cancelled.

With any of the electronic apparatus and the operation mode controlling methods of the present invention described above, when the electronic apparatus is not connected to a second one of the electronic apparatus via the bus, the link layer controller thereof does not operate, and after the connection is established, the link layer controller operates. Consequently, when the electronic apparatus is not connected to any other electronic apparatus, the link layer controller thereof does not dissipate power, and accordingly, saving of the power dissipation can be achieved.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 3 is a diagrammatic view illustrating a flow of signals communicated between a digital video cassette recorder integrated with a camera shown in FIG. 1 and the other node by an IEEE 1394 serial bus and corresponding general operation of the 1394 interface in the digital video cassette recorder integrated with a camera;

FIGS. 4A and 4B are block diagrams illustrating the operation of the 1394 interface illustrated in FIG. 3.

DESCRIPTION OF THE PREFERRED EMBODIMENT

Figures 1, 2:
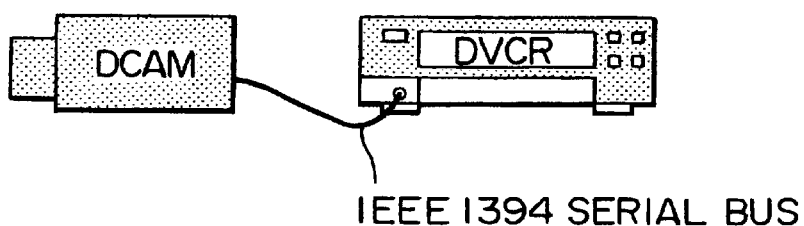
FIG. 1 is a schematic view showing a system to which the present invention is applied.
FIG. 2 is a view illustrating modes of a 1394 interface of each electronic apparatus of the system shown in FIG. 1.
Figure 5:
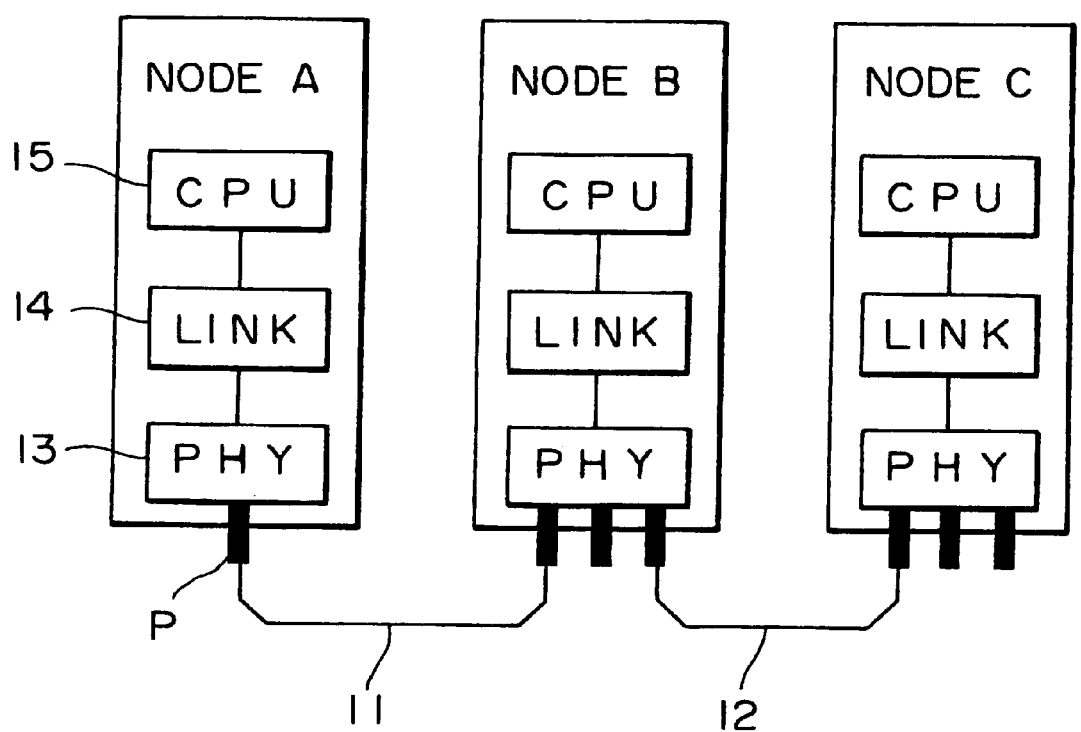
FIG. 5 is a diagrammatic view showing a system wherein a plurality of nodes are interconnected by an IEEE 1394 serial bus such that communication is performed between the nodes.

FIG. 1 shows a system to which the present invention is applied. Referring to FIG. 1, the system shown is composed of two nodes of a digital video cassette recorder integrated with a camera (DCAM) and a digital video cassette recorder (DVCR). The digital video cassette recorder integrated with a camera and the digital video cassette recorder are interconnected by a cable of an IEEE 1394 serial bus.

FIG. 2 illustrates modes of a 1394 interface of each of the nodes. Referring to FIG. 2, "set power supply" represents a power supply to the entire node. Further, "off" of the set power supply represents that no power supply voltage is supplied from the outside to the apparatus, that is, either the apparatus is not connected to a plug or the apparatus has no battery loaded therein, or a power supply switch of the apparatus is set to an off state while a power supply voltage is supplied from the outside to the apparatus. Meanwhile, "on" of the set power supply represents that a power supply voltage is supplied from the outside and a power supply switch of the apparatus is set to an on state. As far as the digital video cassette recorder integrated with a camera is concerned, the "on" signifies that the digital video cassette recorder integrated with a camera is set to a video mode or a camera mode.

Further, "yes" or "no" of the bus connection signifies whether or not the apparatus is connected to any other apparatus by an IEEE 1394 serial bus. Meanwhile, "1394 interface mode" signifies a mode of the 1394 interface.

As seen in FIG. 2, when the set power supply is "off", the mode of the 1394 interface is "off" irrespective of whether or not there is a bus connection. In this instance, the power supply mode of each of the blocks of the CPU, link layer controller and physical layer controller which form the 1394 interface is "reset". When the power supply mode is "reset", the block does not operate.

When the set power supply is "on", if there is no bus connection, then the mode of the 1394 interface is "standby", but if there is a bus connection, then the mode of the 1394 interface is "on". Whether the mode of the 1394 interface is "standby" or "on", the power supply modes of the CPU and the physical layer controller are "on". When the power supply modes are "on", those blocks perform ordinary operation. On the other hand, the power supply mode of the link layer controller is "reset" when the mode of the 1394 interface is "standby", but is "on" when the mode of the 1394 interface is "on". When the power supply mode is "on", the link layer controller performs ordinary operation.

FIG. 3 is a diagram illustrating a flow of signals communicated between the digital video cassette recorder integrated with a camera shown in FIG. 1 and another node (here, the digital video cassette recorder) via the IEEE 1394 serial bus and corresponding general operation of the 1394 interface in the digital video cassette recorder integrated with a camera. Further, FIG. 4A illustrates operation of the 1394 interface in the front half of FIG. 3 while FIG. 4B illustrates operation of the 1394 interface in the rear half of FIG. 3. In the following, operation of the 1394 interface in the present embodiment is described with reference to FIGS. 1, 3, 4A and 4B.

First, the set power supplies to the digital video cassette recorder integrated with a camera and the digital video cassette recorder are switched from off to on. Then, the digital video cassette recorder integrated with a camera and the digital video cassette recorder are connected to each other by a cable of an IEEE 1394 serial bus as shown in FIG. 1.

When the set power supply to each of the digital video cassette recorder integrated with a camera and the digital video cassette recorder changes from off to on, the power supply mode of the CPU 15 changes to "on" as seen in FIG. 3, and resetting of the power supply mode of the physical layer controller 13 is cancelled under the control of the CPU 15. However, the power supply mode of the link layer controller 14 remains in the reset state. Then, the power supply mode (LPS: LINK POWER STATUS) of the link layer controller 14 is transmitted from the CPU 15 to the physical layer controller 13. In the reset state, the power supply mode LPS=0.

After the power supply mode of the physical layer controller 13 changes to "on", the physical layer controller 13 outputs a bias voltage (TP bias) to an associated IEEE 1394 serial bus. Similarly, also the digital video cassette recorder which is the other node outputs a bias voltage (TP bias) to the IEEE 1394 serial bus.

When the physical layer controller 13 of the digital video cassette recorder integrated with a camera detects a bias voltage outputted from the digital video cassette recorder to the IEEE 1394 serial bus, it transmits the bias voltage to the CPU 15. The CPU 15 thus knows that the digital video cassette recorder integrated with a camera has been connected to the other node by the IEEE 1394 serial bus. Further, when the serial voltage is detected, the physical layer controller 13 starts bus resetting.

After bus resetting is started, the connection relationship (tree structure) of the nodes is determined automatically. It is assumed here that it is decided that the digital video cassette recorder integrated with a camera becomes a parent and the digital video cassette recorder becomes a child.

After the tree structure is decided, a self ID packet is successively transmitted to the IEEE 1394 serial bus from the nodes in order beginning with the child node of the tree structure. Then, ascending physical ID numbers are allocated to the nodes in order of transmission of the self ID packets. Here, the physical address #0 is allocated to the digital video cassette recorder which first transmits its self ID packet, and the physical address #1 is allocated to the digital video cassette recorder integrated with a camera which transmits its self ID packet later.

The physical layer controller 13 of each node can know the total number of nodes connected to the IEEE 1394 serial bus from the number of self ID packets received from the IEEE 1394 serial bus. Here, since the physical layer controller 13 of each node receives a self ID packet only from the other node connected directly to the node, it can be discriminated that the total number of nodes is 2.

A self ID packet has information (L bit) indicative of a status of the link layer controller 14, and information (C bit) indicative of whether or not the node itself is capable of acting as an isochronous resource manager (IRM) which is a managing node of the bus. Here, the self ID packet transmitted by the digital video cassette recorder integrated with a camera has the L bit=0 (this represents that the link layer controller is in a reset mode) and the C bit=1 (this represents that the digital video cassette recorder integrated with a camera is capable of acting as an isochronous resource manager).

A node which tries to send out isochronous data such as a digital video signal to the IEEE 1394 serial bus requests the isochronous resource manager described above for a use band and a use channel so that it may be authorized to send out the data. Then, while a node with which C bit=1, L bit=1 and the physical address is maximum is capable of acting as an isochronous resource manager, in the state illustrated in the former half of FIG. 3, since the power supply mode of the link layer controller 14 is "reset", even if the CPU 15 inquires of the link layer controller 14 about the isochronous resource manager, the total number of nodes and so forth, no reply can be obtained. This manner is illustrated in FIG. 4A.

Thus, the CPU 15 transmits LPS=1 to the physical layer controller 13 and cancels resetting of the power supply mode of the link layer controller 14 to change the power supply mode to "on". Then, the CPU 15 instructs the physical layer controller 13 to start bus resetting.

After bus resetting is started, the connection relationship (tree structure) of the nodes is automatically decided as described hereinabove. In this instance, in order to make the physical address of the digital video cassette recorder integrated with a camera maximum, the CPU 15 instructs the physical layer controller 13 to set the root hold bit (RHB) to "1". The physical layer controller 13 delays, when RHB=1, the timing of the inquiry about the connection relationship (tree structure) to the other apparatus connected to the IEEE 1394 serial bus so that the physical layer controller 13 may become the parent (root) of the tree structure and have a maximum physical address. Here, it is assumed that the digital video cassette recorder integrated with a camera becomes the parent and the digital video cassette recorder becomes a child.

After the tree structure is decided, a self ID packet is successively transmitted to any other node from the nodes in order beginning with the child node. Here, the physical address #0 is allocated to the digital video cassette recorder integrated with a camera which transmits its self ID packet first, and the physical address #1 is allocated to the digital video cassette recorder integrated with a camera which transmits its self ID packet later. Then, the self ID packet transmitted from the digital video cassette recorder integrated with a camera has the L bit=1 (this represents that the link layer controller is in an on mode) and the C bit=1 (this represents that the digital video cassette recorder integrated with a camera is capable of acting as an isochronous resource manager).

The physical layer controller 13 of each node transmits received self ID packets to the link layer controller 14. The link layer controller 14 can discriminate, from the number of the received self ID packets, the total number of nodes connected to the IEEE 1394 serial bus. Here, since only the self ID package transmitted from the other node connected directly is received, it can be discriminated that the total number of nodes is 2. Then, the digital video cassette recorder integrated with a camera can discriminate, from the facts that the total number of nodes is 2 and the physical address of the digital video cassette recorder integrated with a camera itself is #1, that the digital video cassette recorder integrated with a camera itself has a maximum physical address from among the nodes connected to the IEEE 1394 serial bus. Accordingly, the link layer controller 14 in the digital video cassette recorder integrated with a camera can discriminate that the total node number is 2 and the physical address of the isochronous resource manager is #1 (that is, the digital video cassette recorder integrated with a camera itself).

If the CPU 15 inquires of the link layer controller 14 about the isochronous resource manager and the total node number, then it can receive a reply from the link layer controller 14 and discriminate that the isochronous resource manager is the digital video cassette recorder integrated with a camera itself. This manner is illustrated in FIG. 4B. Consequently, the digital video cassette recorder integrated with a camera can acquire a band and a channel by itself, registers them into an internal register and sends out isochronous data immediately.

It is to be noted that, while the system of the embodiment described above includes two nodes including the digital video cassette recorder integrated with a camera and the digital video cassette recorder, the present invention can be applied similarly also to other systems which include three or more different nodes such as a personal computer.

Having now fully described the invention, it will be apparent to one of ordinary skill in the art that many changes and modifications can be made thereto without departing from the spirit and scope of the invention as set forth herein.

What is claimed is:

1. An electronic apparatus for a system wherein said electronic apparatus is connected to a second electronic apparatus by a bus to effect communication with said second electronic apparatus, comprising:

a communication interface for performing communication via said bus;

said communication interface including a physical layer controller, a link layer controller, and a CPU, wherein said link layer controller is not operative when a connection of said electronic apparatus to said second electronic apparatus via said bus is not detected, but is operative after the connection is detected.

2. An electronic apparatus according to claim 1, wherein said physical layer controller detects that said electronic apparatus is connected to said second electronic apparatus and notifies said CPU of the detection, and said CPU renders said link layer controller operative.

3. An electronic apparatus according to claim 1, wherein said bus is a serial bus conforming to the IEEE 1394 format.

4. An electronic apparatus according to claim 1, wherein said electronic apparatus is drivable by a battery.

5. An electronic apparatus for a system wherein said electronic apparatus is connected to a second electronic apparatus by a bus to effect communication with said second electronic apparatus, comprising:

a communication interface for performing communication via said bus;

said communication interface including a physical layer controller, a link layer controller, and a controller for at least an application layer; and said link layer controller having a power supply mode which is kept, even if said electronic apparatus is in a power-on state, in a reset state until after the connection of said electronic apparatus to said second electronic apparatus via said bus is detected, the reset state of the power supply mode of said link layer controller being cancelled after the connection is detected.

6. An electronic apparatus according to claim 5, wherein said controller for the application layer is formed from a CPU.

7. An electronic apparatus according to claim 6, wherein said physical layer controller detects that said electronic apparatus is connected to said second electronic apparatus and notifies said CPU of the detection, and in response to the notification, said CPU cancels the reset state of the power supply mode of said link layer controller.

8. An electronic apparatus according to claim 7, wherein said electronic apparatus holds the reset state of the power supply mode of said link layer controller as information representative of a power status.

9. An electronic apparatus according to claim 8, wherein, when said CPU receives the notification from said physical layer controller, said CPU inquires of said link layer controller, and if the information representative of the power status of said link layer controller is a reset mode, then said CPU cancels the reset state of the information representative of the power status of said link layer controller to enable operation of said link layer controller.

10. An electronic apparatus according to claim 9, wherein the information representative of the power status is a bit representative of a status of said link layer controller and is included in a self ID packet to be sent by said electronic apparatus.

11. An electronic apparatus according to claim 5, wherein said bus is a serial bus conforming to the IEEE 1394 format.

12. An electronic apparatus according to claim 5, wherein said electronic apparatus is drivable by a battery.

13. An operation mode controlling method for an electronic apparatus, comprising the steps of:

detecting a connection of said electronic apparatus to a second electronic apparatus; and controlling a link layer controller in said electronic apparatus so that, when said electronic apparatus tries to communicate with said second electronic apparatus connected thereto by a bus, said link layer controller does not operate while said electronic apparatus is not connected to said second electronic apparatus via said bus, but after the connection is established, said link layer controller is rendered operative.

14. An operation mode controlling method for an electronic apparatus, comprising the step of:

controlling a link layer controller in said electronic apparatus so that, when said electronic apparatus tries to communicate with a second electronic apparatus connected thereto by a bus, even if said electronic apparatus is in a power-on state, a power supply mode of said link layer controller is kept in a reset state until after the connection of said electronic apparatus to said second electronic apparatus via said bus is confirmed, and after the connection is confirmed, the reset state of the power supply mode of said link layer controller is cancelled.

15. An operation mode controlling method according to claim 14, wherein the communication is performed by a communication interface, said communication interface including a physical layer controller, said link layer controller, and a control function element for at least an application layer.

16. An operation mode controlling method according to claim 15, wherein, when a power supply to said electronic apparatus is turned from an off state to an on state, a power supply mode of said control function element for at least the application layer is turned on and a reset state of a power supply mode of said physical layer controller is cancelled, and the power supply to said link layer controller is not turned on until it is detected that said electronic apparatus is connected to said second electronic apparatus via said bus.

17. An operation mode controlling method according to claim 16, wherein, after the power supply mode of said control function element for at least the application layer is turned on and the reset state of the power supply mode of said physical layer controller is cancelled, said physical layer controller outputs a bias voltage to said bus and detects a bias voltage from said second electronic apparatus.

18. An operation mode controlling method according to claim 17, wherein, when the bias voltage is detected, resetting of said bus is started, whereafter a connection relationship between said first and second electronic apparatus connected to each other is decided.

19. An operation mode controlling method according to claim 18, wherein, after the connection relationship is decided, said control function element for at least the application layer inquires of said link layer controller, and if the power status of said link layer controller then is a reset mode, said CPU cancels the reset state of the power supply mode of said link layer controller.

20. An operation mode controlling method according to claim 19, wherein the resetting of said bus by said physical layer controller is started again after the cancellation of the reset state of the power supply mode of said link layer controller.

* * * * *